(12) United States Patent
Ito et al.

(10) Patent No.: US 11,340,478 B2
(45) Date of Patent: May 24, 2022

(54) OPTICAL TRANSMITTER

(71) Applicant: Nippon Telegraph and Telephone Corporation, Tokyo (JP)

(72) Inventors: Toshihiro Ito, Musashino (JP); Ken Tsuzuki, Musashino (JP); Masayuki Takahashi, Musashino (JP); Kiyofumi Kikuchi, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/294,980

(22) PCT Filed: Dec. 5, 2019

(86) PCT No.: PCT/JP2019/047536
§ 371 (c)(1),
(2) Date: May 18, 2021

(87) PCT Pub. No.: WO2020/121928
PCT Pub. Date: Jun. 18, 2020

(65) Prior Publication Data
US 2022/0011606 A1 Jan. 13, 2022

(30) Foreign Application Priority Data
Dec. 11, 2018 (JP) .............................. JP2018-231859

(51) Int. Cl.
*H04B 10/50* (2013.01)
*G02F 1/01* (2006.01)
*G02F 1/21* (2006.01)

(52) U.S. Cl.
CPC ........... *G02F 1/0121* (2013.01); *H04B 10/50* (2013.01); *G02F 1/212* (2021.01); *H04B 10/501* (2013.01); *H04B 10/505* (2013.01)

(58) Field of Classification Search
None
See application file for complete search history.

(56) References Cited

U.S. PATENT DOCUMENTS 5,729,378 A * 3/1998 Tanaka ................. G02F 1/0344 359/254
7,011,458 B2 * 3/2006 Kagaya ................ G02F 1/0121 385/92

(Continued)

OTHER PUBLICATIONS

Zhu et al., Modeling and Optimization of the Bond-Wire Interface in a Hybrid CMOS-Photonic Traveling-Wave MZM Transmitter, (Year: 2016).*

(Continued)

*Primary Examiner* — Jai M Lee
(74) *Attorney, Agent, or Firm* — Workman Nydegger (57) ABSTRACT

Provided is an optical transmitter having improved frequency characteristics by controlling the band by using components constituting the optical transmitter. An optical transmitter including an optical modulator that includes a traveling-wave electrode and a terminating resistor, and an optical modulator driver configured to drive the optical modulator, in which a characteristic impedance of a transmission line connecting the optical modulator driver and the optical modulator is 20% or more higher than a characteristic impedance of the optical modulator, and an electrical length of the transmission line is 1/20 or more and 1/2 or less of a wavelength corresponding to a 3 dB band frequency of an electrical signal driving the optical modulator.

14 Claims, 6 Drawing Sheets

(56) References Cited

U.S. PATENT DOCUMENTS

| | | | |
|---|---|---|---|
| 7,345,803 B2* | 3/2008 | Nakajima | G02F 1/0316 |
| | | | 359/237 |
| 2004/0016920 A1* | 1/2004 | Akiyama | H01S 5/0265 |
| | | | 257/14 |
| 2008/0285978 A1 | 11/2008 | Choi et al. | |
| 2021/0080795 A1* | 3/2021 | Kikuchi | G02F 1/0356 |
| 2021/0409123 A1* | 12/2021 | Komatsu | H04B 10/548 |

OTHER PUBLICATIONS

N. Wolf et al., *Electro-Optical Co-Design to Minimize Power Consumption of a 32 GBd Optical IQ-Transmitter Using InP MZ-Modulators,* 2015 IEEE Compound Semiconductor Integrated Circuit Symposium (CSICS), Oct. 11, 2015, pp. 117-120.

Shigeru Kanazawa et al., *56-Gbaud 4-PAM (112-Gbit/s) Operation of Flip-Chip Interconnection Lumped-Electrode EADFB Laser module for Equalizer-Free Transmission,* 2016 Optical Fiber Communications Conference and Exhibition (OFC), Mar. 20, 2016, pp. 1-3.

Kehan Zhu et al., *Modeling and Optimization of the Bond-Wire Interface in a Hybrid CMOS-Photonic Traveling-Wave MZM Transmitter,* 2016 29th IEEE International System-on-Chip Conference (SOCC), Sep. 6, 2016, pp. 151-156.

* cited by examiner

OPTICAL TRANSMITTER

TECHNICAL FIELD

The present disclosure relates to an optical transmitter, and, more particularly, to an optical transmitter that is used in digital coherent communication and that includes an optical modulator and a driver configured to drive the optical modulator.

BACKGROUND ART

In recent years, the total communication capacity required for various services, such as 5G mobile communication and video on demand (VOD) continues to increase, and the number of backbone optical communication lines is also required to increase constantly. Thus, there is a need for a high-capacity communication apparatus is required not only in the backbone lines connecting cities hundreds of kilometers or more away from each other, but also in relatively short-distance lines connecting cities less than 100 km away from each other or data centers. In the related art, the digital coherent communication technique, which has been used only for thousands of kilometers of backbone lines, has also come to be used for communication of relatively short distances of around 100 km, due to excellent characteristics such as dispersion tolerance and high reception sensitivity in addition to large communication capacity. Because the communication network is subdivided toward the network edge, the number of communication devices used at these distances is much more than in the case of a backbone line. Thus, the demand for miniaturization and cost reduction of communication devices is much greater compared with long-distance communication devices.

In optical transmitters used for digital coherent communication, in the related art, high-performance lithium niobate (LN) modulators have been used. Further, semiconductor optical modulators have recently been used for miniaturization as described above. As a semiconductor material, indium phosphide (InP) is suitable for miniaturization and high performance, but a silicon optical modulator using silicon photonics technique is also used for miniaturization and integration of optical circuits.

While the miniaturization of the communication device progresses, in recent years, the speed of signal transmission baud rate has become faster, and is about to reach 64 Gbaud from 32 Gbaud. As the frequency rate for transmission increases, the demand for high frequency characteristics for components constituting the optical transmitter is also increased.

Figure 1A:
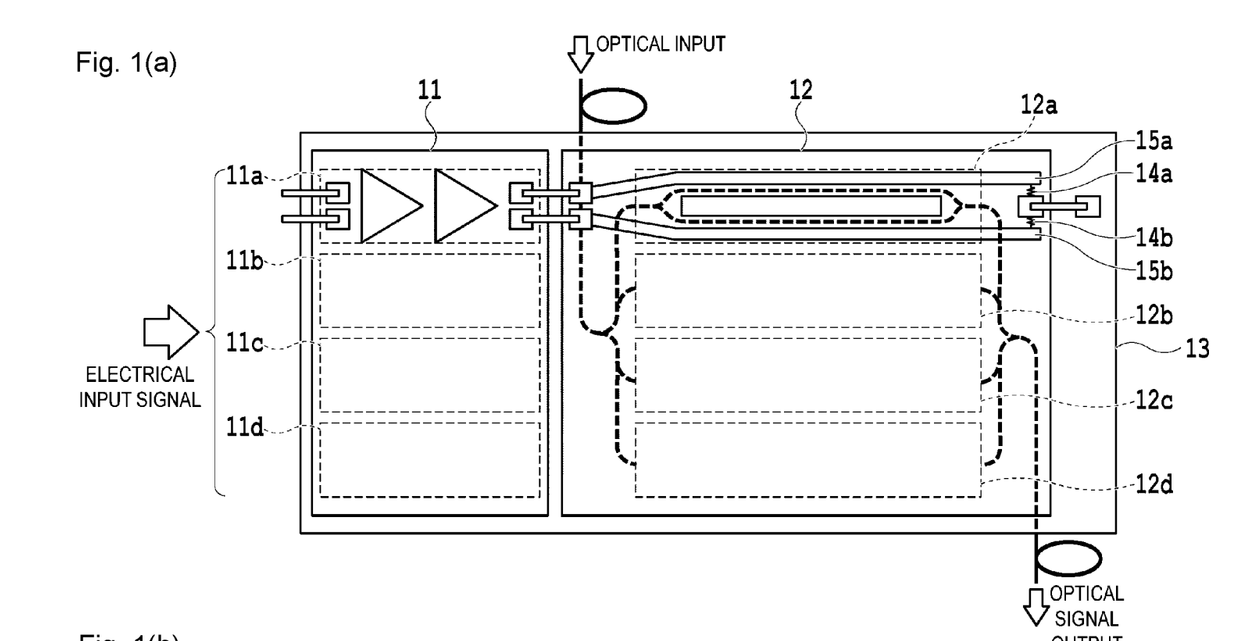
Figure 1B:
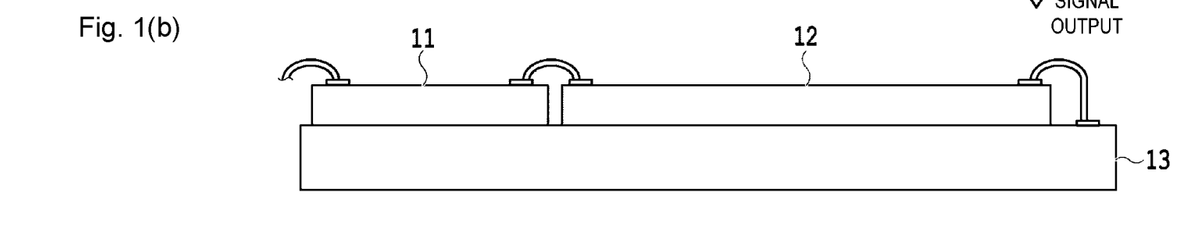

FIG. 1 illustrates a configuration of an optical modulation unit of a coherent optical transmitter in the related art. In the optical transmitter, an optical modulator driver IC 11 connected to a signal source and a semiconductor optical modulator 12 connected to a light source are mounted on a substrate 13 in a package. The semiconductor optical modulator 12 is, for example, a dual polarization in-phase quadrature optical modulator (DP-IQ optical modulator), and includes two sets of IQ optical modulators each including two Mach-Zehnder optical modulators. By applying a voltage to the pn junction of the two arm waveguides of the Mach-Zehnder optical modulators 12a to 12d, the refractive index is changed due to the electro-optical effect of a semiconductor, such as a Pockels effect, a carrier plasma effect, or the like. In each of the Mach-Zehnder optical modulators 12a to 12d, an optical input from a light source is modulated by an electro-optical effect caused by an applied voltage on which a modulation signal is superimposed, combined, and output as an optical signal output (DP-QPSK signal, DP-16QAM signal, or the like).

In the semiconductor optical modulator 12, because the electrical signal amplitude required to obtain sufficient electro-optical effect is high, the optical modulator driver IC 11 is used to amplify the electrical input signal to obtain sufficient amplitude. The configuration of the driver ICs 11a to 11d of the optical modulator driver IC 11 has various types as described in Non Patent Literature 1. For a compact configuration, an open collector type configuration is useful for a bipolar transistor, and an open drain type configuration is useful for an FET. In the open collector type configuration, the power consumption is low because the driver ICs 11a to 11d do not incorporate a sending-end resistor. In addition, the driver ICs 11a to 11d and the Mach-Zehnder optical modulators 12a to 12d can be used by being directly connected to each other, so that there is an advantage that there is no need for an external component such as a bias tee for DC separation, and a small and inexpensive configuration is possible.

A traveling-wave electrodes 15a and 15b are commonly used as the Mach-Zehnder optical modulators 12a to 12d. In this optical modulator, sufficient modulation efficiency can be obtained by propagating the light and the electrical signal in the same direction. In the configuration of the traveling-wave electrodes 15a and 15b, the terminating resistors 14a and 14b are connected to the opposite side of the connection end of the driver ICs 11a to 11d such that the electrical signal input to the Mach-Zehnder optical modulators 12a to 12d is not reflected back from the end of the electrode. The terminating resistors 14a and 14b are designed to approximately match the characteristic impedance of the traveling-wave electrodes 15a and 15b as the lines, and the electrical return loss of the Mach-Zehnder optical modulators 12a to 12d seen from the driver ICs 11a to 11d is maximum when the resistance values of the terminating resistors 14a and 14b match the characteristic impedance.

With respect to the mounting form of the optical transmitter, a flip-chip configuration as described in Non Patent Literature 2 is often used to achieve a particularly large reduction in size. In this method, the semiconductor chip with a metal ball attached to each electrode pad is mounted backwards, so there is no need for a wide area around the semiconductor chip as in bonding. Further, because heat dissipation from the upper surface is facilitated, there is an advantage that the entire package on which the semiconductor chip is mounted can be easily mounted in a form of a leadless, compact ball grid array (BGA).

CITATION LIST

Non Patent Literature

Non Patent Literature 1: N. Wolf, L. Yan, J.-H. Choi, T. Kapa, S. Wunsch, R. Klotzer, K.-O. Vethaus, H.-G. Bach, M. Schell, "Electro-Optic Co-Design to Minimize Power Consumption of a 32 GBd Optical IQ-Transmitter Using InP MZ-Modulators", 2015 IEEE Compound Semiconductor Integrated Circuit Symposium (CSICS), pp. 117-120, 2015.

Non Patent Literature 2: S. Kanazawa, T. Fujisawa, K. Takahatal, Y. Nakanishil, H. Yamazaki, Y. Ueda, W. Kobayashi, Y. Muramoto, H. Ishii, and H. Sanjoh, "56-Gbaud 4-PAM operation of flip-chip interconnection lumped-electrode EADFB laser module for equalizer-free transmission", OFC2016, W4J. 1, 2016.

SUMMARY OF THE INVENTION

Technical Problem

In a case where the optical modulator driver IC 11 and the semiconductor optical modulator 12 are flip-chip mounted instead of a bonding mounting, as in the optical transmitter illustrated in FIG. 1, the optical modulator driver IC 11 and the semiconductor optical modulator 12 are connected by a line on the substrate. As described above, in order to maximize the electrical return loss of the semiconductor optical modulator 12 seen from the optical modulator driver IC 11, the line on the substrate is also required to be designed to match the characteristic impedance of the traveling-wave electrodes 15*a* and 15*b*.

Regardless of whether it is a bonding connection or a flip-chip mounting, when 400 G transceivers that require a high baud rate transmitter such as 64 Gbaud are configured, the band may be insufficient in a method in the related art for simply connecting the optical modulator driver IC 11 and the semiconductor optical modulator 12. When the frequency characteristics are low, there is a problem that the power spectrum of the entire signal is attenuated, even the intensity of transmission light is reduced, and the dynamic range of the transceiver is reduced.

Means for Solving the Problem

An object of the present disclosure is to provide an optical transmitter having improved frequency characteristics by controlling the band by using components constituting the optical transmitter.

To achieve such an object, an aspect of the present disclosure is an optical transmitter including an optical modulator that includes a traveling-wave electrode and a terminating resistor, and an optical modulator driver configured to drive the optical modulator, in which a characteristic impedance of a transmission line connecting the optical modulator driver and the optical modulator is 20% or more higher than a characteristic impedance of the optical modulator, and an electrical length of the transmission line is ½₀ or more and ½ or less of a wavelength corresponding to a 3 dB band frequency of an electrical signal driving the optical modulator.

Effects of the Invention

According to the present disclosure, a response improves around a desired frequency, a constant frequency peaking effect can be obtained, and frequency characteristics can be improved.

BRIEF DESCRIPTION OF DRAWINGS

FIG. 1 is a diagram illustrating a configuration of an optical modulation unit of a coherent optical transmitter in the related art.

FIGS. 1(*a*) and 1(*b*) are diagrams illustrating a configuration of an optical modulation unit of a coherent optical transmitter in the related art.

FIGS. 2(*a*) and 2(*b*) are diagrams illustrating a configuration of an optical modulation unit of an optical transmitter according to Example 1 of the present disclosure.

FIGS. 6(*a*) and 6(*b*) are diagrams illustrating a configuration of an optical modulation unit of an optical transmitter according to Example 2 of the present disclosure.

FIGS. 7(*a*) and 7(*b*) are diagrams illustrating a configuration of an optical modulation unit of an optical transmitter according to Example 3 of the present disclosure.

DESCRIPTION OF EMBODIMENTS

Hereinafter, an embodiment of the present disclosure will be described in detail with reference to the drawings.

EXAMPLE 1

Figure 2A:
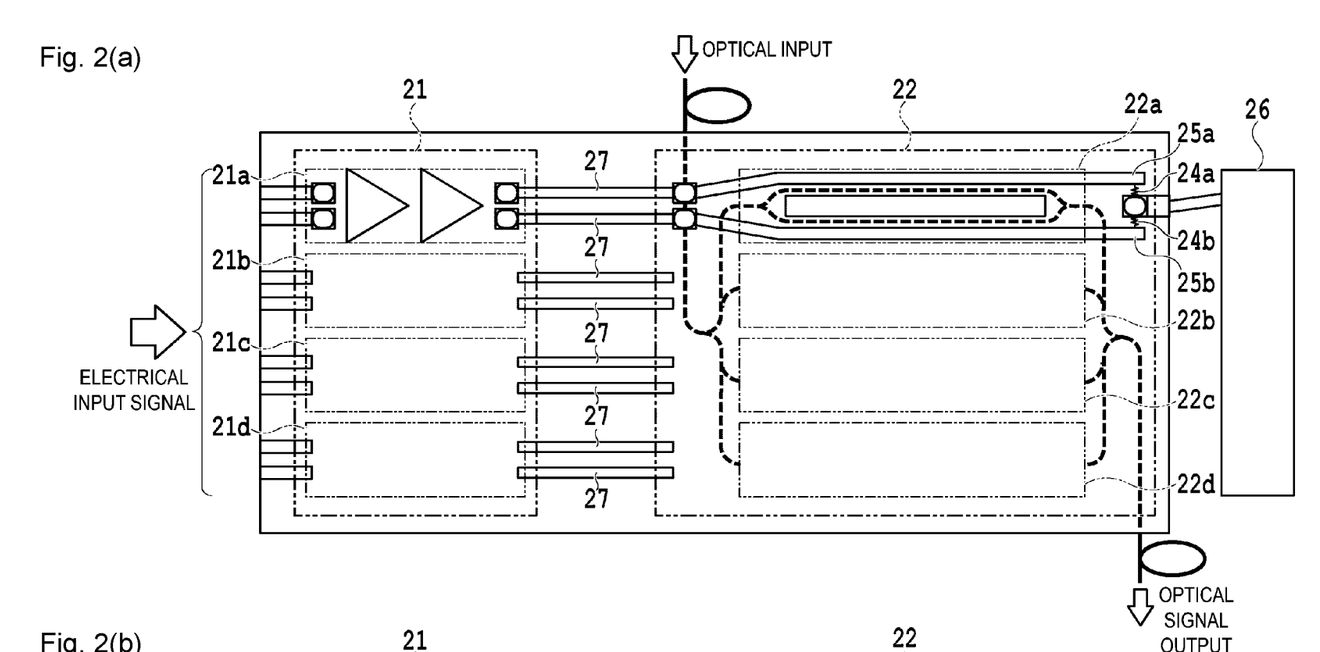
Figure 2B:
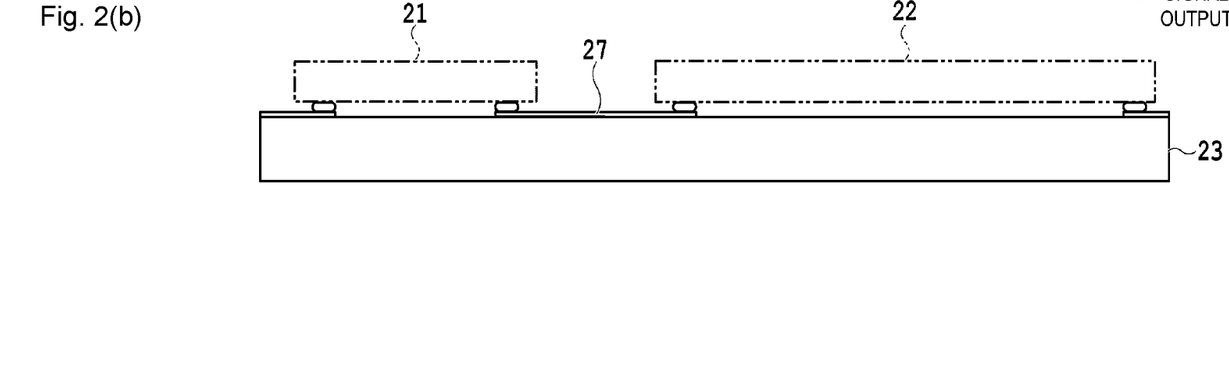

FIG. 2 illustrates a configuration of an optical modulation unit of an optical transmitter according to Example 1 of the present disclosure. In the optical transmitter, the optical modulator driver IC 21 connected to a signal source and the semiconductor optical modulator 22 connected to a light source are mounted on a substrate 23 in a package. The semiconductor optical modulator 22 is, for example, Dual Polarization In-phase Quadrature optical modulator (DP-IQ optical modulator), and includes two sets of IQ optical modulators each including two Mach-Zehnder optical modulators. In each of the Mach-Zehnder optical modulators 22*a* to 22*d*, an optical input from a light source is modulated by an applied voltage on which a modulation signal is superimposed, combined, and output as an optical signal output (DP-QPSK signal, DP-16QAM signal, or the like). Traveling-wave electrodes 25*a* and 25*b* are used for the Mach-Zehnder optical modulators 22*a* to 22*d*, and the terminating resistors 24*a* and 24*b* are connected to the Mach-Zehnder optical modulators 22*a* to 22*d* such that the input signal is not reflected back from the end of the electrode.

The driver ICs 21*a* to 21*d* of the optical modulator driver IC 21 have an open collector type configuration for a bipolar transistor, or an open drain type configuration for an FET, and a current is supplied from the power supply 26 connected via the terminating resistors 24*a* and 24*b*. For an open collector type or an open drain type, there is no sending-end resistor, so that the output reflection characteristic is a total reflection characteristic. Thus, there is no power consumption due to sending-end resistor, and has a configuration of a direct electrical connection to the Mach-Zehnder optical modulators 22*a* to 22*d*, so that an external component such as the bias tee is not required.

The optical modulator driver IC 21 and the semiconductor optical modulator 22 are flip-chip mounted on the substrate 23 and are connected by a transmission line 27 on the substrate.

In Example 1, a driver IC having an open collector type or an open drain type output form is provided, and a characteristic impedance (Z) of the transmission line connected between the driver IC and the optical modulator is set to be 20% or more higher than a characteristic impedance (Z0) of the optical modulator including the traveling-wave electrode and the terminating resistor. Additionally, the delay time (TD) due to the transmission line is set to 1/20 or greater of the period (τ) of the electrical signal of the target frequency. The configuration of Example 1 will be described in detail below.

Because the characteristic impedance of the transmission line 27 between the optical modulator driver IC 21 and the semiconductor optical modulator 22 does not match the characteristic impedance of the semiconductor optical modulator 22, a signal is reflected at the connection between the transmission line 27 and the semiconductor optical modulator 22. On the other hand, the output ends of the driver ICs 21a to 21d, which are the other end of the transmission line 27, are an open collector type or an open drain type, so that the reflection characteristic is total reflection. Thus, multiple reflections occur at both ends of the transmission line 27, and the frequency characteristics of the entire optical modulation unit of the optical transmitter change.

Figure 3:
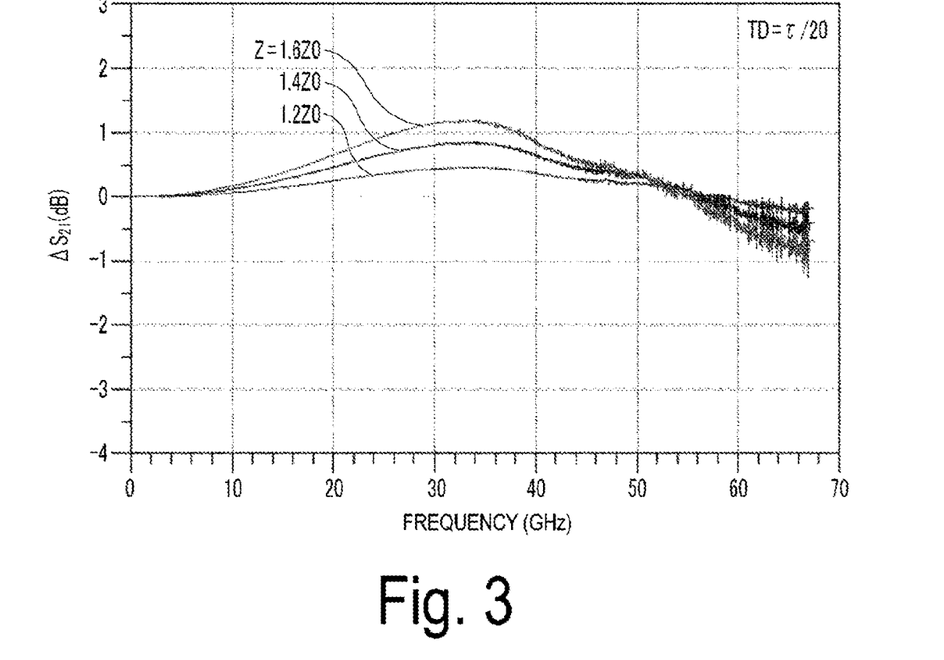
FIG. 3 is a diagram illustrating a frequency characteristic of the optical transmitter when the length of a transmission line is fixed and the characteristic impedance of the transmission line is changed.

FIG. 3 illustrates a change in the frequency characteristic of the optical transmitter when the length of the transmission line is fixed and the characteristic impedance of the transmission line is changed. Specifically, FIG. 3 illustrates a difference (ΔS21) in the frequency characteristic compared with the case where the characteristic impedance of the transmission line 27 matches the characteristic impedance of the semiconductor optical modulator 22. The difference is expressed in decibels, and represents a difference obtained by subtracting the frequency characteristic when the optical modulator driver IC 21 and the semiconductor optical modulator 22 are directly connected from the frequency characteristic when the optical modulator driver IC 21 and the semiconductor optical modulator 22 are connected via the transmission line 27. Z0 represents the characteristic impedance of the semiconductor optical modulator 22 and τ represents the period of the electrical signal of the target frequency. In FIG. 3, the frequency is 32 GHz, and the period is τ.

Figure 4:
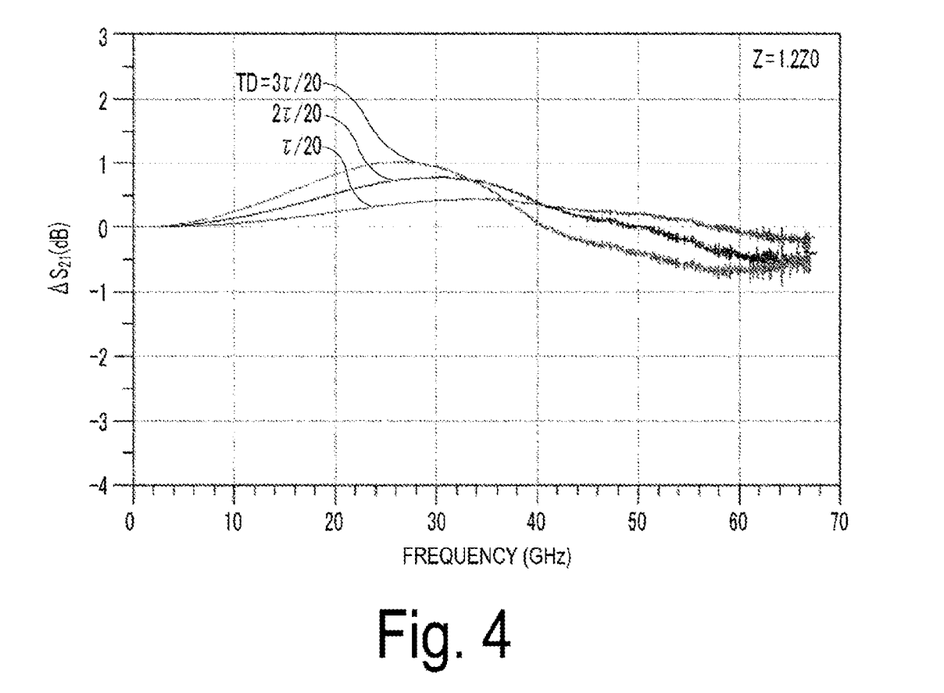
FIG. 4 is a diagram illustrating a frequency characteristic of the optical transmitter when the characteristic impedance of the transmission line is fixed and the length of the transmission line is changed.
Figure 5:
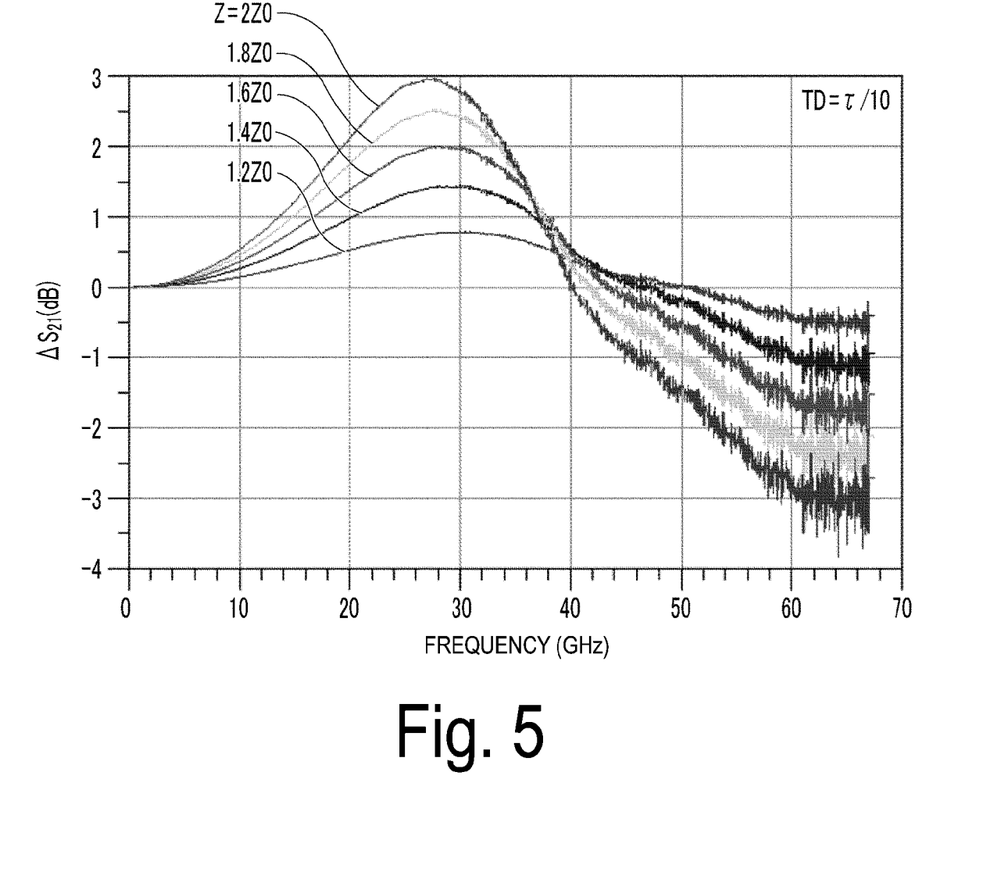
FIG. 5 is a diagram illustrating a frequency characteristic of the optical transmitter when the length of the transmission line is fixed and the characteristic impedance of the transmission line is changed.

FIG. 3 corresponds to a case where the length of the transmission line 27 is set to a constant value of τ/20 and the characteristic impedance is changed, similarly, FIG. 4 corresponds to a case where the characteristic impedance of the transmission line 27 is set to a constant value of 1.2Z0 and the length is changed, and FIG. 5 corresponds to a case where the length of the transmission line 27 is set to a constant value of τ/10 and the characteristic impedance is changed. In consideration of the frequency loss at the time of mounting on the optical transmitter, it is desirable that frequency characteristics are raised around the target frequency of 32 GHz.

Referring to FIGS. 3 to 5, it can be seen that almost no peaking effect is obtained at a frequency of around 32 GHz when the characteristic impedance of the transmission line 27 is less than approximately 1.2Z0 or when the length of the transmission line 27 is less than approximately τ/20. This is because, when the impedance change is significantly small, reflection hardly occurs at the impedance change part and a contribution to the multiple reflection becomes small. This is also because, when the length of the transmission line is short, that is, when the delay time is small, the phase hardly turns and does not change at the desired frequency. On the other hand, when the delay time is significantly long and the phase turns more than or equal to half a wavelength at the desired wavelength, a standing wave occurs, so that the wavelength needs to be less than or equal to half a wavelength of the desired wavelength. In other words, the length of the transmission line needs to be approximately τ/2 or less.

From the above description, the characteristic impedance (Z) of the transmission line 27 is set to be 20% or more higher than the characteristic impedance (Z0) of the semiconductor optical modulator 22, and the length of the transmission line 27 is set to be 1/20 or more of the electrical length corresponding to the wavelength such that a delay of 1/20 or more of the frequency (which normally corresponds to the required 3 dB band frequency) of an electrical signal driving the optical modulator occurs. Such a configuration improves the response around a desired frequency and results in a constant frequency peaking effect.

Note that, since the characteristic impedance (Z) between the driver IC and the optical modulator is required to be made higher than the characteristic impedance (Z0) of the optical modulator, the characteristic impedances (Z) of the output line or output pad in the optical modulator driver IC 21 or the impedances of the input line or input pad to the Mach-Zehnder optical modulators 22a to 22d in the semiconductor optical modulator 22 may be made 20% or more higher than the characteristic impedance (Z0) of the semiconductor optical modulator 22. Effectively, it can contribute to the length of the transmission line that connects the driver IC and the optical modulator, and the same effect as the impedance change of the transmission line can be expected. Further, additional effects can be expected when both are used in combination.

EXAMPLE 2

Figures 6A, 6B:
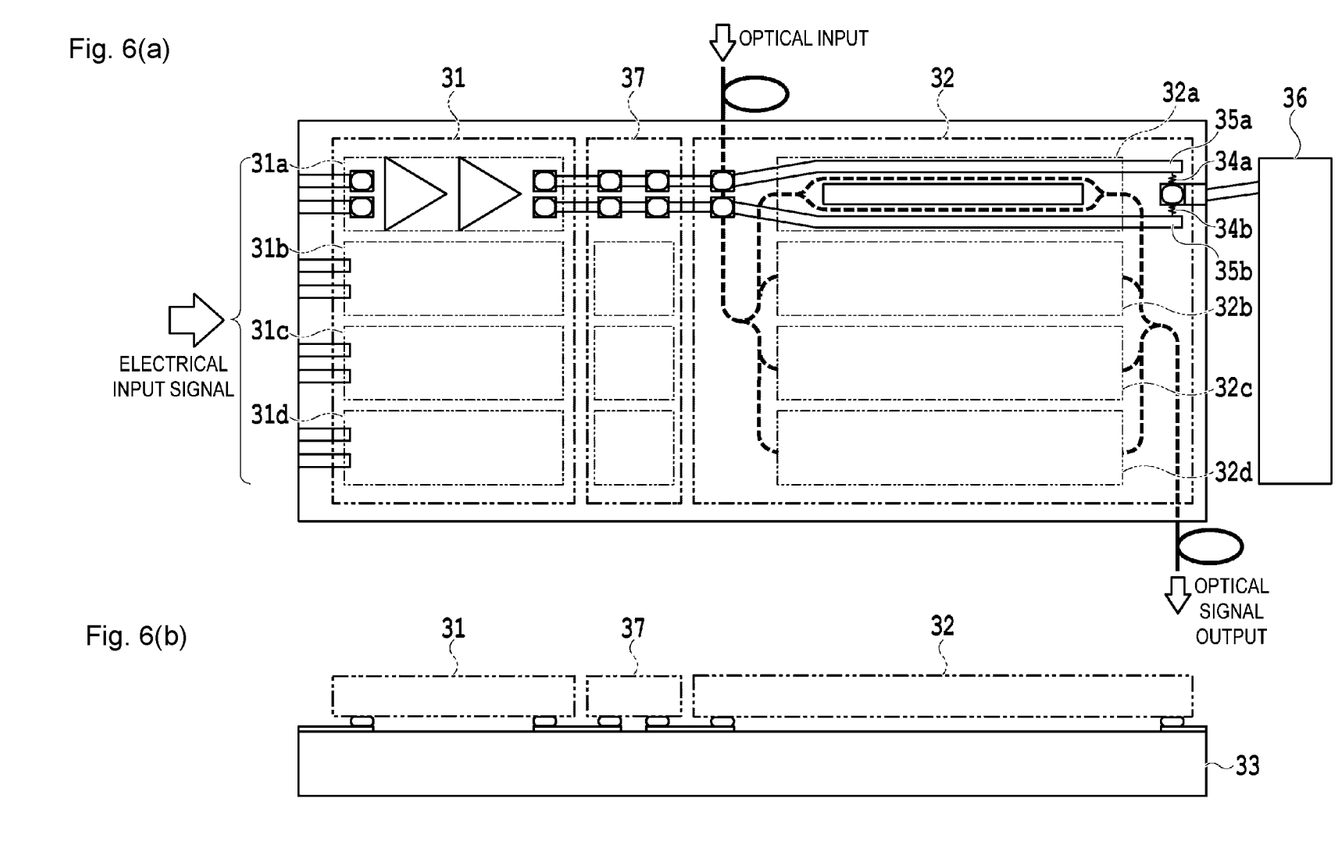

FIG. 6 illustrates a configuration of an optical modulation unit of an optical transmitter according to Example 2 of the present disclosure. In the optical transmitter, the optical modulator driver IC 31 connected to a signal source and the semiconductor optical modulator 32 connected to a light source are mounted on a substrate 33 in a package. Traveling-wave electrodes 35a and 35b are used for the Mach-Zehnder optical modulators 32a to 32d, and the terminating resistors 34a and 34b are connected to the Mach-Zehnder optical modulators 32a to 32d such that the input signal is not reflected back from the end of the electrode.

The driver ICs 31a to 31d of the optical modulator driver IC 31 have an open collector type configuration or open drain type configuration, and a current is supplied from the power supply 36 connected via the terminating resistors 34a and 34b. The optical modulator driver IC 31 and the semiconductor optical modulator 32 are flip-chip mounted on the substrate 33, and are connected to each other by a line substrate 37 in which transmission lines having a desired impedance are formed, similar to Example 1.

In order to set impedance to a desired impedance, the transmission line may not only be created linearly, but can be a curved line to increase the distance in the same area. Further, the line substrate 37 is flip chip mounted, so that a line substrate with a desired impedance may be selected and mounted, from among line substrates with different impedances. Further, to prevent interference with the outside, such as other channels, a portion of the transmission line can be formed as an inner layer line of the package made of a multilayer ceramic substrate, and even in this case, the transmission line can also be a curved line.

EXAMPLE 3

Figure 7A:
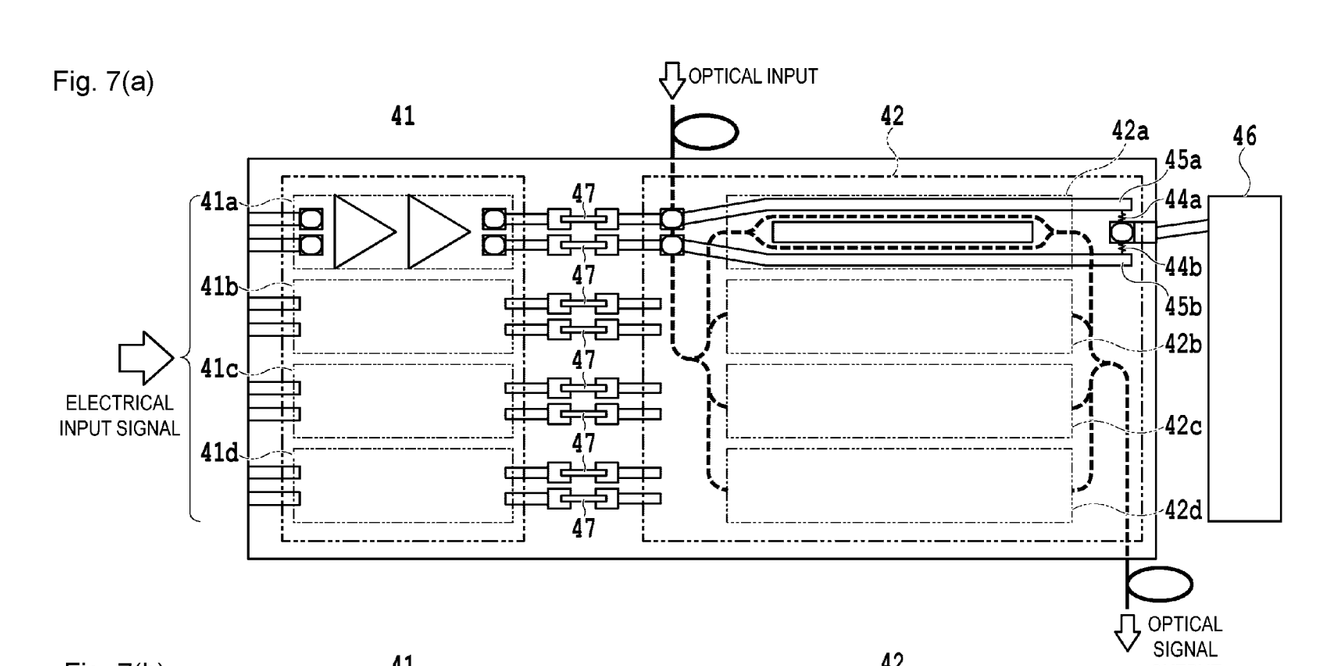
Figure 7B:
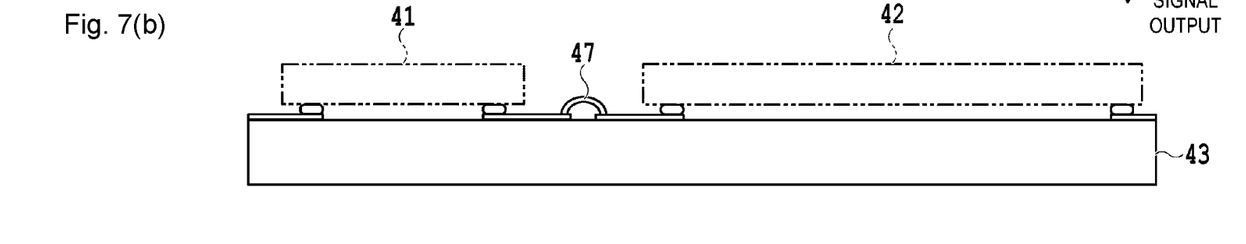

FIG. 7 illustrates a configuration of an optical modulation unit of an optical transmitter according to Example 3 of the present disclosure. In the optical transmitter, the optical modulator driver IC 41 connected to a signal source and the semiconductor optical modulator 42 connected to a light source are mounted on a substrate 43 in a package. Traveling-wave electrodes 45*a* and 45*b* are used for the Mach-Zehnder optical modulators 42*a* to 42*d*, and the terminating resistors 44*a* and 44*b* are connected to the Mach-Zehnder optical modulators 42*a* to 42*d* such that the input signal is not reflected back from the end of the electrode.

The driver ICs 41*a* to 41*d* of the optical modulator driver IC 41 have an open collector type configuration or open drain type configuration, and a current is supplied from the power supply 46 connected via the terminating resistors 44*a* and 44*b*. The optical modulator driver IC 41 and the semiconductor optical modulator 42 are connected by bonding wires 47 that connect pads formed on the substrate 43, and form transmission lines having a desired impedance, similar to Example 1. By varying the thickness, length, and number of bonding wires, the desired impedance can be set.

The driver ICs of Examples 1 to 3 are an open collector type or an open drain type, but the output impedance is required to be high to the extent that multiple reflection occurs between the output end of the driver IC and the connection of the transmission line and the semiconductor optical modulator. Specifically, the output impedance of the driver IC is required to be three times or more higher than the characteristic impedance of the optical modulator.

According to the present embodiment, the band is controlled by the components constituting the optical transmitter, a response improves around a desired frequency, and a constant frequency peaking effect is obtained. Thus, the frequency characteristics of the optical transmitter can be improved even in a case where an optical modulator driver IC and a semiconductor optical modulator in the related art are applied.

REFERENCE SIGNS LIST

11, 21, 31, 41 Optical modulator driver IC
12, 22, 32, 42 Semiconductor optical modulator
13, 23, 33, 43 Substrate
14, 24, 34, 44 Terminating resistor
15, 25, 35, 45 Traveling-wave electrode
26, 36, 46 Power supply
27 Transmission line
37 Line substrate
47 Bonding wire

The invention claimed is:

1. An optical transmitter comprising:
   an optical modulator that includes a traveling-wave electrode and a terminating resistor; and
   an optical modulator driver configured to drive the optical modulator, wherein
   a characteristic impedance of a transmission line connecting the optical modulator driver and the optical modulator is 20% or more higher than a characteristic impedance of the optical modulator, and
   an electrical length of the transmission line is 1/20 or more and 1/2 or less of a wavelength corresponding to a 3 dB band frequency of an electrical signal driving the optical modulator.

2. The optical transmitter according to claim 1, wherein an output impedance of the optical modulator driver is three times or more higher than the characteristic impedance of the optical modulator.

3. The optical transmitter according to claim 2, wherein an output of the optical modulator driver is an open collector type or an open drain type.

4. The optical transmitter according to claim 2, wherein an impedance of an output line or an output pad of the optical modulator driver, or an impedance of an input line or an input pad of the optical modulator is higher than the characteristic impedance of the optical modulator.

5. The optical transmitter according to claim 2, wherein the optical modulator and the optical modulator driver are flip-chip mounted on a substrate, and the transmission line is formed on a line substrate which is flip-chip mounted on the substrate.

6. The optical transmitter according to claim 2, wherein the optical modulator and the optical modulator driver are flip-chip mounted on a substrate, and the transmission line is a bonding wire that connects pads formed on the substrate.

7. The optical transmitter according to claim 3, wherein an impedance of an output line or an output pad of the optical modulator driver, or an impedance of an input line or an input pad of the optical modulator is higher than the characteristic impedance of the optical modulator.

8. The optical transmitter according to claim 3, wherein the optical modulator and the optical modulator driver are flip-chip mounted on a substrate, and the transmission line is formed on a line substrate which is flip-chip mounted on the substrate.

9. The optical transmitter according to claim 3, wherein the optical modulator and the optical modulator driver are flip-chip mounted on a substrate, and the transmission line is a bonding wire that connects pads formed on the substrate.

10. The optical transmitter according to claim 1, wherein an impedance of an output line or an output pad of the optical modulator driver, or an impedance of an input line or an input pad of the optical modulator is higher than the characteristic impedance of the optical modulator.

11. The optical transmitter according to claim 10, wherein the optical modulator and the optical modulator driver are flip-chip mounted on a substrate, and the transmission line is formed on a line substrate which is flip-chip mounted on the substrate.

12. The optical transmitter according to claim 10, wherein the optical modulator and the optical modulator driver are flip-chip mounted on a substrate, and the transmission line is a bonding wire that connects pads formed on the substrate.

13. The optical transmitter according to claim 1, wherein the optical modulator and the optical modulator driver are flip-chip mounted on a substrate, and the transmission line is formed on a line substrate which is flip-chip mounted on the substrate.

14. The optical transmitter according to claim 1, wherein the optical modulator and the optical modulator driver are flip-chip mounted on a substrate, and the transmission line is a bonding wire that connects pads formed on the substrate.

* * * * *